UNITED STATES PATENT OFFICE.

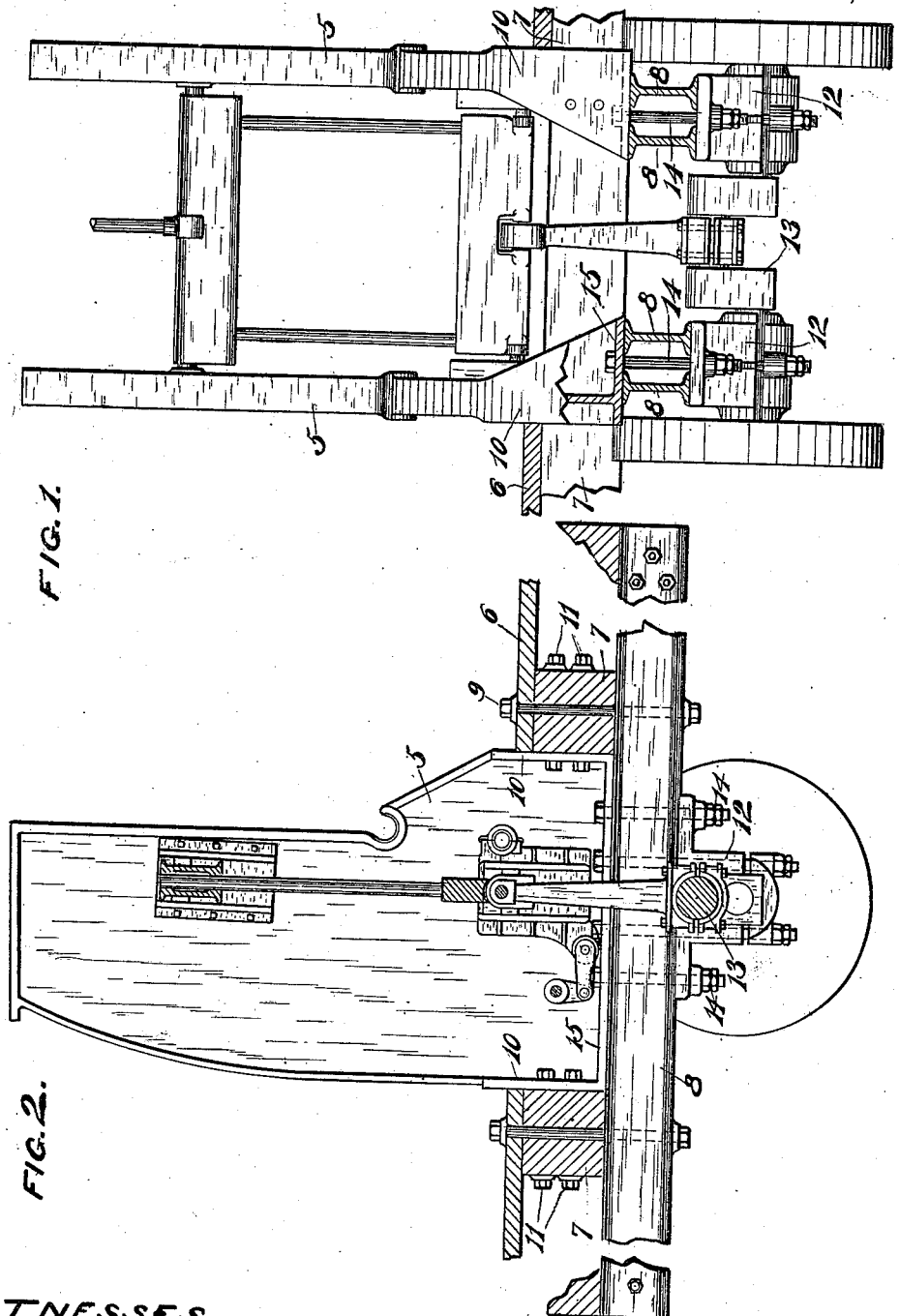

THEODORE S. WILKIN, OF OSHKOSH, WISCONSIN; JOHN B. CARPENTER, OF OSHKOSH, WISCONSIN, SPECIAL ADMINISTRATOR OF SAID THEODORE S. WILKIN, DECEASED.

GANG-SAW BASE.

996,183. Specification of Letters Patent. Patented June 27, 1911.

Application filed July 15, 1908. Serial No. 443,633.

*To all whom it may concern:*

Be it known that I, THEODORE S. WILKIN, residing in Oshkosh, in the county of Winnebago and State of Wisconsin, have invented new and useful Improvements in Gang-Saw Bases, of which the following is a description, reference being had to the accompanying drawings, which are a part of this specification.

This invention has for its object to provide a gang saw with a base comprising beams extending beneath the floor of the mill, beneath and across the girders thereof and firmly bolted or otherwise secured thereto, said beams having the frame of the gang saw mounted directly upon them and having the pillow blocks of the crank shaft mounted therebeneath and held by bolts clamping the beams between the pillow blocks and the gang saw frame.

Referring to the accompanying drawings in which like characters of reference indicate the same parts in the different views; Figure 1 is a front elevation of a gang saw having a base constructed in accordance with this invention, parts being sectioned; and, Fig. 2 is a central sectional view thereof.

In these drawings 5 represents the frame of the gang saw, the two side members of which pass through the floor 6 and between the girders 7 thereof and rest upon beams 8 which are securely clamped beneath the girders by heavy bolts 9 wherever the said beams cross the girders, these beams being of any desirable length to secure an extended base for the gang saw beneath the floor which will steady the saw in its operation and prevent parts working loose. The beams 8 are preferably metal I-beams arranged in pairs bolted together and with the bolts 9 passing therebetween. The lower ends of the side members of the frame have webs 10 which are secured by bolts 22 to the girders 7 which fit against the front and back of the frame, and the pillow blocks 12 for the crank shaft 13 are clamped to the under side of the beams 8 by bolts 14 which also pass between the pairs of I-beams and engage the flanges 15 forming the base plates of the frame.

In gang saw constructions wherein the frame base is mounted on top of the mill floor the length of such base is necessarily limited for need of floor space, and because of the short base the jar and vibrations due to the operation of the machine are severe and cause parts to work loose and become deranged. By providing a base constructed in accordance with this invention, with beams running beneath the mill floor, the length of the base may be made as long as desired as it does not occupy floor space, and as these beams are firmly secured to the girders of the floor which they cross at intervals the effect is to make a large area of the floor framework itself act as a base for steadying the machine in its operation. The pillow blocks being clamped to the frame of the machine with the I-beams therebetween are firmly and rigidly held in place and are not liable to work loose.

What I claim as my invention and desire to secure by Letters Patent is:—

1. In a gang saw, a base comprising beams crossing beneath and secured to the girders of the mill floor, a frame mounted on the beams, a crank shaft beneath the beams, and pillow blocks in which the crank shaft is journaled clamped to the frame and against the under side of the beams.

2. In a gang saw, a base, comprising pairs of I-beams extending beneath and across the girders of the mill floor, bolts engaging the beams and passing through the girders of the mill floor, a gang saw frame resting upon the beams, a crank shaft beneath the beams, pillow blocks for the crank shaft on the under side of the beams, bolts passing through the pillow blocks and the gang saw frame and between the I-beams of each pair to tightly clamp the frame upon the upper side of the beams and the pillow blocks on the lower side of the beams.

3. In a gang saw, a base, comprising pairs of I-beams bolted together and extending beneath and across the girders of the mill floor, bolts passing between the beams of each pair and through the girders to firmly secure the beams to the floor frame, a gang saw frame passing through the floor and resting upon the beams, bolts securing the gang saw frame to the adjacent girders of the floor, a crank shaft beneath the beams, pillow blocks for the crank shaft on the under side of the beams, and bolts passing through the pillow blocks and the frame and between the beams of each pair to clamp the pillow blocks and the frame on opposite sides of the beams.

In testimony whereof, I affix my signature, in presence of two witnesses.

THEODORE S. WILKIN.

Witnesses:
R. S. C. CALDWELL,
ANNA F. SCHMIDTBAUER.

Copies of this patent may be obtained for five cents each, by addressing the "Commissioner of Patents, Washington, D. C."